United States Patent [19]
Guidetti et al.

[11] Patent Number: 5,789,451
[45] Date of Patent: Aug. 4, 1998

[54] ALKANOLAMINE/CARBON DIOXIDE ADDUCT AND POLYURETHANE FOAM THEREWITH

[75] Inventors: Giuliano Guidetti, Carpi, Italy; Luigi Pellacani, Terneuzen, Netherlands; Maurizio Bottazzi, Reggio Emilia, Italy

[73] Assignee: The Dow Chemcial Company, Midland, Mich.

[21] Appl. No.: 681,690

[22] Filed: Jul. 29, 1996

[51] Int. Cl.$^6$ .................................................. C08G 18/32
[52] U.S. Cl. ........................... 521/51; 521/116; 521/128; 521/129; 521/172; 521/174
[58] Field of Search ......................... 521/51, 172, 174, 521/128, 129, 116

[56] References Cited

U.S. PATENT DOCUMENTS

| | | | |
|---|---|---|---|
| 3,425,964 | 2/1969 | Stanley | 260/2.5 |
| 4,469,856 | 9/1984 | Rasshofer et al. | 528/45 |
| 4,499,038 | 2/1985 | Schafer et al. | 264/51 |
| 4,645,630 | 2/1987 | Rasshofer et al. | 264/54 |
| 4,735,970 | 4/1988 | Eisen et al. | 521/128 |
| 5,464,880 | 11/1995 | Weber et al. | 521/51 |
| 5,510,054 | 4/1996 | Mussini | 252/182.23 |
| 5,587,117 | 12/1996 | Sommerfeld et al. | 264/45.7 |

FOREIGN PATENT DOCUMENTS

| | | |
|---|---|---|
| 681430 | 5/1966 | Belgium . |
| 2 121 556 | 8/1972 | France . |
| 2 132 102 | 1/1972 | Germany . |

*Primary Examiner*—Morton Foelak
*Attorney, Agent, or Firm*—Norman L. Sims

[57] ABSTRACT

Disclosed is a carbamate adduct prepared by contacting carbon dioxide with an alkanolamine, preferably in a polar medium. The alkanolamine is characterized in that it consists of 1 or 2 ether linkages per molecule. The adduct finds value as a thermally decomposable blowing agent when preparing polyurethane foam and elastomeric products. Integral-skinned polyurethane products prepared in the presence of the carbamate adducts disclosed herein exhibit an enhanced abrasion resistance.

13 Claims, No Drawings

ALKANOLAMINE/CARBON DIOXIDE ADDUCT AND POLYURETHANE FOAM THEREWITH

This invention relates to an alkanolamine/carbon dioxide adduct wherein the alkanolamine has one or two ether linkages/molecule; and the use of the adduct to prepare a polyurethane polymer.

BACKGROUND OF THE INVENTION

The manufacture of polyurethane polymers often requires the production of a polymer having a reduced density to provide suitability and economic viability for the use in certain applications. Polyurethane polymers of reduced density, also referred to as polyurethane foam, are generally prepared by reacting an organic polyisocyanate with a polyether or polyester polyol in the presence of a physical blowing agent. Traditionally the employed blowing agents have been organic substances such as the fully halogenated or "hard" chlorofluorocarbons as exemplified by trichlorofluoromethane. However the continued use of "hard" chlorofluoroalkanes has been restricted by many governmental agencies in the interest of the environment. As an alternative, "soft" chlorofluoroalkanes distinguished by a hydrogen atom content such as, for example, dichorofluoromethane, tetrafluoroethane or chlorofluoromethane, have been proposed. The blowing efficiency of the mentioned alternative substances is frequently inferior to trichlorofluoromethane, and system solubility problems leading to processing complications are often encountered when preparing polyurethane foam. A more recently proposed alternative is the use of aliphatic or alicyclic alkanes and especially n-pentane, isopentane or cyclopentane. However the use of alkanes can also be accompanied by system solubility problems and additionally a flammability risk, unless appropriate precautions are taken. A yet more recent alternative now proposed in many instances is the use of water. Water is a "chemical" blowing agent and provides for a reduced density of the polyurethane polymer by its exothermic reaction with the polyisocyanate leading to the in situ generation of gaseous carbon dioxide which then confers the reduced density to the polymer. The use of water is associated with formation of a polyurea content in the polyurethane polymer and frequently confers an undesirable hardness and brittleness to the foam requiring compensation by selection of polyol or polyisocyanate. Additionally when intending to prepare an integral-skinned polyurethane product it is well recognized that use of water to generate carbon dioxide generally does not provide for an attractive skin formation.

It is now widely accepted that carbon dioxide is to be the blowing agent of choice meeting many of the customer desires and environmental demands. Accordingly, it would be desirable to provide an alternative source of carbon dioxide which is able to minimize the recognized deficiencies of water when producing a polyurethane foam, including an integral-skinned product.

Carbon dioxide can also be generated by thermal decomposition of certain inorganic substances such as ammonium carbonate or ammonium hydrogen carbonate. Organic substances can also be a source of carbon dioxide by their thermal decomposition, exemplary of such substances include carbon dioxide complexes of amines. U.S. Pat. No. 3,425,964 discloses the use of a solid substance, obtained by contacting carbon dioxide with a liquid polyfunctional amine, as curing agent when preparing a polyurethane polymer. DE 21 32 102 discloses the preparation of complexes by contacting carbon dioxide with a low molecular weight polyamine. The patent publication FR 2,121,556 discloses the preparation of a complex from ethanolamine with carbon dioxide and use of the adduct when manufacturing a polyurethane polymer. Similarly, the publication U.S. Pat. No. 5,464,880 discloses the preparation of CFC-free cellular polyurethane polymer in the presence of a complex obtained from an aliphatic aminoalcohol with carbon dioxide. U.S. Pat. Nos. 4,645,630 and 4,499,038 disclose use of amine/carbon dioxide adducts in the manufacture of polyurethane polymers wherein the amine has at least 3 aliphatic ether groups per molecule.

To provide a polyurethane polymer with a commercially attractive reduced density it is necessary to use the above mentioned substances in a relatively large amount to generate the required volume of carbon dioxide; this amount becomes significantly greater with increasing molecular weight of the amine. If polyurethane polymer is prepared in the presence of amines of elevated molecular weight this can significantly change and lead to inferior or undesirable physical properties of a resulting polyurethane polymer. To overcome these deficiencies it would be desirable to provide for an amine/carbon dioxide adduct which is able to release a significantly larger volume of carbon dioxide per part by weight of complex. To facilitate handling it would also be desirable to provide for an amine/carbon dioxide adduct which is liquid at ambient temperature. Further it would be desirable if the use of the complex when manufacturing a polyurethane polymer has the ability to improve the physical properties of the resulting polyurethane polymer.

SUMMARY OF THE INVENTION

In a first aspect, this invention relates to a carbamate adduct obtained by contacting carbon dioxide with an alkanolamine wherein the alkanolamine is a substance having one or two ether moieties per molecule.

In a second aspect, this invention relates to a liquid composition which, based on their combined total weight, comprises (a) from about 5 to about 95 weight percent of a carbamate adduct, and (b) from about 95 to about 5 weight percent of a non-aqueous medium, characterized in that the carbamate adduct is obtained by contacting carbon dioxide with an alkanolamine being a substance having one or two ether moieties per molecule.

In a third aspect, this invention relates to a process for obtaining a carbamate adduct which comprises contacting, in a non-aqueous medium, carbon dioxide with an alkanolamine characterized in that:

(a) the alkanolamine has the following general formula when a secondary amine, of

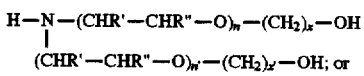

when a primary amine, of

where independently R' is hydrogen, methyl or ethyl; R" is hydrogen, methyl or ethyl; the integer n is 1 or 2 or n' is 0, 1 or 2 with the proviso that the sum of n and n' is less than 3 but at least 1; and the integer x or x' is a whole number of from 1 to 4; and (b) the medium is a protic or aprotic substance being a liquid at ambient temperature, wherein components (a) and (b) are present in a parts by weight ratio of from about 95:5 to about 5:95.

In a fourth aspect, this invention relates to a polyurethane foam obtained by reacting an organic polyisocyanate with a polyether or polyester polyol in the presence of a blowing agent which comprises a carbamate adduct, or composition thereof, as mentioned above.

In a fifth aspect, this invention relates to an integral-skinned polyurethane foam obtained by reacting a reaction mixture in a sealed mold wherein said reaction mixture comprises:

(a) an organic polyisocyanate having an isocyanate content of from at least 10 weight percent;

(b) a polyether or polyester polyol having an average of from about 2 to about 4 hydroxyl groups per molecule and an average molecular weight of from about 1000 to about 10000; and (c) a blowing agent which includes a carbamate, or composition thereof, as mentioned above.

Surprisingly it has been found that such carbamate adducts are readily prepared and conveniently employed as blowing agent when manufacturing polyurethane polymers having a reduced density. Even more surprisingly it has been found that such adducts can provide for C-42,651 the formation of integral skinned polyurethane products with carbon dioxide being the principle blowing means. It is also found that the integral-skinned products such as for example steering wheels have enhanced physical properties including abrasion resistance relative to products prepared in the absence of the subject amine/carbon dioxide adduct.

DETAILED DESCRIPTION OF THE INVENTION

The invention disclosed herein relates to a carbamate adduct, or a composition thereof, being a liquid at room temperature and comprising the said carbamate adduct with a liquid medium. The carbamate adduct is characterized in that it has a thermal decomposition temperature of at least 60° C., preferably at least 75° C., and up to about 130° C. A decomposition lower than this temperature is not practical with respect to handling the adduct. A decomposition temperature higher than this has limited value when preparing a polyurethane polymer as the reaction exotherm encountered during the preparation of the polymer and which is used to effect decomposition of the adduct may not be much higher than 130° C.

When the carbamate adduct is present as a composition the composition comprises, based on the combined total weight of components (a) and (b), component (a) in from about 5 to about 95 weight percent of the carbamate adduct, and component (b) in from about 95 to about 5 weight percent of a non-aqueous liquid medium. Advantageously, the adduct is present in an amount of preferably from about 25 to about 85, more preferably from about 35 to about 75, and yet more preferably in an amount of from about 45 to 55 weight percent. Commensurate with this, the liquid medium is preferably present in an amount of from about 75 to about 15, more preferably from about 65 to about 25, and yet more preferably in an amount of from about 55 to about 45 weight percent.

The carbamate adduct of this invention is obtained by contacting carbon dioxide with an alkanolamine wherein the alkanolamine is a substance containing one or two ether moieties per molecule. Use of such an alkanolamine provides: firstly, for adducts which are liquid at room temperature; secondly, for adducts that have a viscosity convenient for the manufacture of polyurethane polymer; and thirdly, for adducts that are able to release an attractive amount of carbon dioxide.

The alkanolamine can be a secondary amine but preferably is a primary amine. Primary amines exhibit a greater reactivity with respect to formation of the carbamate. When the alkanolamine is a primary amine it is characterized by the following general formula,

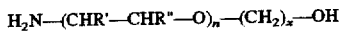

$$H_2N-(CHR'-CHR''-O)_n-(CH_2)_x-OH$$

and when the alkanolamine is a secondary amine it is characterized by the following general formula,

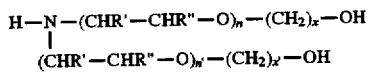

$$H-N\begin{matrix}-(CHR'-CHR''-O)_n-(CH_2)_x-OH\\ |\\ (CHR'-CHR''-O)_{n'}-(CH_2)_{x'}-OH\end{matrix}$$

wherein, independently, R' is hydrogen, methyl or ethyl; R" is hydrogen, methyl or ethyl; the integer n or n' is 1 or 2 with the proviso that the sum of n and n' is less than 3; and the integer x or x' is a whole number of from 1 to 4. Exemplary of a suitable and preferred alkanolamine is the primary amine 2-(2-aminoethoxy)ethane or 2-(2-(2-aminoethoxy)ethoxy)ethanol.

The liquid medium component of the above mentioned composition can be an aprotic or preferably a protic substance which is a liquid at ambient temperature. By the term "ambient temperature" it is generally understood room temperature, that is about 25° C. Exemplary of protic substances include a liquid diol or triol or especially a polyoxyalkylene diol or triol including (polyoxy)ethylene, (polyoxy)propylene-, or (polyoxy)butylene substances. Advantageously, to provide for end use value, the diol or triol substances correspond to reactants commonly used in the manufacture of polyurethane polymers. In the present invention notably of value as protic medium are found to be low molecular weight (polyoxy)ethylene, (polyoxy)propylene-, or a (polyoxy)butylene triols and especially diols. By the term low molecular weight it is understood substances having a molecular weight of advantageously less than 1000, preferably less than 600, and more preferably about 400 or less. Substance suitable for use as the protic medium include ethylene glycol, 1,2- or 1,3-propane glycol, 1,5-pentanediol, 1,6-hexanediol, glycerine, trimethyolpropane with preferred substances including ethylene glycol, propylene glycol, dipropylene glycol, 1,2- or 1,3- or 1,4-butane diol. Also suitable as protic medium are the ethylene oxide, propylene oxide or butylene oxide adducts of the above mentioned substances having a molecular weight of less than 1000.

The carbamate adduct of this invention is prepared by contacting, advantageously within a non-aqueous medium, carbon dioxide with an alkanolamine as described above. The non-aqueous liquid medium is as described above. By the term "non-aqueous" it is meant that essentially no water is present. In the event that the medium has a residual water content this should not exceed 0.5 weight percent and preferably should be less than about 0.2 weight percent. The alkanolamine and medium advantageously are present in a parts by weight ratio of from 5:95 to about 95:5. The alkanolamine is preferably present in a ratio of from about 15:85 to about 85:15, more preferably from about 25:75 to about 75:25, and yet more preferably in from about 45:55 to about 55:45. If the amount of alkanolamine present exceeds this proportion the viscosity of the resulting carbamate product may become inconveniently high. Applicants have found that preparing the carbamate in the presence of a protic medium helps to enhance the conversion of the alkanolamine leading to a higher yield of carbamate.

The process of contacting the carbon dioxide with the alkanolamine is conducted at essentially ambient temperature and pressure with carbon dioxide being introduced at a controlled rate in an amount sufficient to obtain substantially complete conversion of the alkanolamine to carbamate. The formation of carbamate is generally an exothermic reaction; the extent of temperature rise being limited by the controlled rate of addition of the carbon dioxide and optional cooling of the reaction vessel. While it is highly convenient to use gaseous carbon dioxide at ambient temperature and pressure it is also expected that liquefied carbon dioxide can be used if suitable high pressure reactors are available. Independent of source, advantageously the water content of the carbon dioxide does not exceed about 0.2, and preferably does not exceed about 0.1 weight percent.

As mentioned, the carbamate adduct of this invention is primarily intended for use when preparing a polyurethane polymer having a reduced density. Such polyurethane polymer can be a foam, an integral-skinned foam or a microcellular elastomer. By the term "integral-skinned" it is meant that the product has a cellular core and a compact non-cellular skin. By the term "reduced density" it is to be appreciated that the polymer typically has a density of from about 50 to about 1000 kg/m$^3$; preferably from about 150, more preferably from about 300, and preferably up to about 850, more preferably up to about 700 kg/m$^3$.

The polyurethane polymer of reduced density is obtained by reacting an organic polyisocyanate with a polyether or polyester polyol in the presence of a blowing agent which comprises a carbamate adduct or carbamate composition as described herein above. The carbamate or carbamate composition is present in an amount sufficient to provide for the desired degree of blowing. Typically such amount will be of from about 0.1 to about 10, preferably from about 0.5 to about 7, and more preferably from about 1.5 to about 5 parts per 100 parts by weight of polyol. To supplement the blowing action provided by the carbamate adduct, optionally present can be other physical and chemically blowing agents as known to a person skilled in the art. The polyisocyanate, including crude, pure or urethane-modified polyisocyanates, and polyol employed are those as conventionally used when preparing polyurethane and generally known to persons skilled in the art of manufacturing polyurethane polymers.

When preparing integral-skinned foam and especially microcellular elastomers the polyisocyanate component used advantageously is a urethane-modified polyisocyanate, and especially a urethane-modified aromatic polyisocyanate. The isocyanate content of the urethane-modified polyisocyanate advantageously is from at least 10, preferably from at least 15, and more preferably from about 18 to about 33.6 weight percent. When the elastomer to be produced is intended, for example, for a shoe sole application, it is advantageous to use a urethane-modified polyisocyanate having an isocyanate content of from about 17 to about 24 weight percent. When the elastomer to be produced is intended, for example, for a semi-rigid integral skin application, it is advantageous to use a urethane-modified polyisocyanate having an isocyanate content of more than 25 and up to 33.6, preferably from about 27 to about 31, weight percent. The preferred urethane-modified aromatic polyisocyanates are those obtained by reacting an excess of toluene diisocyanate or preferably a methylene diphenylisocyanate with a polyol that is a polyester or preferably a polyether polyol and notably a diol or triol. Applicants have found that methylene diphenylisocyanate modified by reaction with low molecular weight glycol or high molecular weight polyol are equally suitable for this invention. By the term "high molecular weight" it is meant polyols having a molecular weight of 1000 or more. The techniques for preparing such urethane-modified polyisocyanates are well documented in the open literature and will not be further reported herein.

When preparing a polyurethane polymer according to this invention, the polyisocyanate is used in an amount to provide for an isocyanate reaction index of advantageously from about 80 to about 120, preferably from about 90 to about 110, and more preferably from about 95 to about 105. By the term "isocyanate index" it is understood that at an index of 100, that one equivalent of isocyanate is present for each isocyanate reactive hydrogen atom present from the polyol, or other active hydrogen atom bearing substance able to react with the polyisocyanate.

The polyol component suitable for use in preparing the polyurethane polymer according to this invention is a polyester polyol, or preferably a polyether polyol which has an average of from about 2 to about 4, preferably from about 2 to about 3, and more preferably from about 2 to about 2.5 hydroxyl groups/molecule; and an average hydroxyl equivalent weight of from about 500 to about 5000, preferably from about 1000 to about 3500, and more preferably from about 1500 to about 3000. Optionally and advantageously, such polyether polyol may also have a primary hydroxyl content of from at least 50, preferably from at least 75, and more preferably from at least 85 percent based on total hydroxyl content of the polyol. Typically, such polyether polyols may be obtained by reaction of an active hydrogen-containing initiator with a quantity of one or more alkylene oxides to give a product of desired hydroxyl nature and equivalent weight. Generally, such alkylene oxides are $C_{2-4}$ alkylene oxides and include 1,4-butylene oxide, 2,3-butylene oxide, and especially propylene oxide and ethylene oxide. Exemplary of suitable active hydrogen-containing initiators are polyols, polyether adducts of polyols, polyamines and other compounds having a plurality of active hydrogen atoms per molecule, such as those described in U.S. Pat. No. 4,500,422. Preferred initiators for use in preparing polyether polyols suitable for employment in the process of preparing the polyurethane elastomer include ethylene glycol, propylene glycol, butylene glycol, glycerine, 1,1,1-trimethylolpropane, 1,1,1-trimethylolethane, α-methylglucoside, $C_{2-8}$ alkylene diamines such as, for example, ethylenediamine and hexamethylenediamine, and mixtures thereof. Especially preferred are the glycol initiators or alkoxylated adducts of such glycols. Exemplary of commercially available and preferred polyether polyols for use in manufacturing a polyurethane elastomer by the process of this invention are those polyether polyols identified by the trademark "VORANOL" and include products designated as VORANOL EP 1900 and VORANOL CP 6055, sold by The Dow Chemical Company.

In addition to the polyols described herein above other suitable polyols which may be present in the process of preparing the polyurethane elastomer include the so-called polymer polyols based on polyether polyols such as those described in U.S. Pat. No. 4,394,491. Among the useful polymer polyols are included dispersions of vinyl polymers, particularly styrene/acrylonitrile copolymers, in a continuous polyether polyol phase. Also useful are the so-called polyisocyanate polyaddition (PIPA) polyols (dispersions of polyurea-polyurethane particles in a polyol) and the polyurea dispersions in polyol such as, for example, PHD polyols. Copolymer polyols of the vinyl type are described in, for example, U.S. Pat. Nos. 4,390,645; 4,463,107; 4,148, 840 and 4,574,137. Further to the above described polyether polyols and copolymers polyols it is also possible to use in admixture with the above, polyether and polyester polyols generally associated with the manufacture of hard, rigid polyurethane foams. Polyols as generally associated with the manufacture of rigid polyurethane foam are characterized by an average functionality of from about 2 to about 8, preferably from about 3 to about 8, in that they have an average hydroxyl equivalent weight of from about 50 to about 200.

Suitable polyester polyols may, for instance, be produced from dicarboxylic acids, preferably aliphatic dicarboxylic acids, having 2 to 12 carbon atoms in the alkylene radical, and multifunctional alcohols, preferably diols. These acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids; cycloaliphatic dicarboxylic acids such as 1,3- and 1,4-cyclohexane dicarboxylic acid; and aromatic dicarboxylic acids such as phthalic acid and terephthalic acid. Examples of di- and multifunctional, particularly difunctional, alcohols are: ethylene glycol, diethylene glycol, propylene glycol, dipropylene glycol, 1,3-propanediol, 1,10-decanediol, glycerine, trimethylolpropane, and preferably, 1,4-butanediol, and 1,6-hexanediol.

When preparing a polyurethane elastomer as disclosed herein, optionally and advantageously the polyether or polyester polyol is used in admixture with a chain extending agent. The presence of a chain extending agent provides desirable physical properties, especially hardness, of the resulting elastomer. Typically, polyurethane elastomers prepared according to this invention, in the presence of a chain extending agent, will have a Shore A Hardness of from about 20A to about 80A, preferably from 35A to about 75A, and more preferably from about 45A to about 70A. To provide elastomers with such hardness, the chain-extending agent advantageously is used in an amount of from about 2 to about 20, preferably from about 5 to about 15, and more preferably from about 6 to about 12 percent based on total weight of the polyether polyol and chain extending agent.

The chain-extending agent is characterized in that it is an isocyanate-reactive substance, especially an organic difunctional isocyanate-reactive substance that has an equivalent weight of less than or equal to 150 and preferably less than or equal to 100. Representative of suitable chain-extending agents include polyhydric alcohols, aliphatic diamines including polyoxyalkylenediamines, aromatic diamines and mixtures thereof. Preferred chain extending agents are dihydroxyl compounds, especially glycols. Illustrative of suitable chain-extending agents include 1,2-ethanediol, 1,3-propanediol, 1,5-pentanediol, 1,6-hexanediol, 1,2-propanediol, 1,3-butanediol, 1,4-butanediol, 1,6-hexanediol, 1,4-cyclohexanediol, 1,4-cyclohexanedimethanol, ethylenediamine 1,4-butylenediamine and 1,6-hexamethylenediamine. Compounds such as ethoxylated hydroquinone can also be employed as a chain-extending agent. The above mentioned chain extending agents can be used singularly or combined or in admixture with other compounds including diethylene glycol, dipropylene glycol, tripropylene glycol, ethanolamine, diethanolamine, triethanolamine and N-methyldiethanolamine, and N-ethyldiethanolamine, as well as adducts obtained by esterification of aliphatic carboxylic acids with aliphatic diols or triols such as those exemplified above utilizing from 0.01 to 1.08 mole of acid per mole of diol/triol. While any of the chain extending agents exemplified above can be employed in the process of preparing the polyurethane elastomer, it is particularly preferred to use 1,4-butanediol, 1,6-hexanediol, neopentyl glycol, 1,4-cyclohexane diol, ethylene glycol, bis-hydroxyethoxybenzene, ethoxylated hydroquinone glycerine, and diethylene glycol either alone or in admixture. Especially preferred as chain-extending agent is 1,2-ethanediol. When preparing RIM type polyurethane foam products optionally present can be a crosslinking agent, such agents are substances having an isocyanate reactive hydrogen functionality of greater than 2, and preferably of 3 or more such as exemplified by glycerine.

As mentioned herein above, the polyurethane elastomer is prepared in the presence of carbon dioxide, generated through the thermal decomposition of the carbamate, as a blowing agent. In addition to the carbamate also present can be other blowing means including water, aliphatic or alicyclic $C_{3-8}$ alkanes, or a chlorine-free halogenated alkane, or mixtures thereof. Water, if present, is typically employed in an amount of from about 0.05 to about 2, preferably from about 0.1 to about 1.5 and more preferably from about 0.14 to about 0.8 weight percent, based on the total weight of the polyol and optional chain-extending agent present. Exemplary of suitable aliphatic or alicyclic $C_3$–$C_8$ alkanes include butane, n-pentane, i-pentane, hexane, cyclopentane and cyclohexane. Exemplary of suitable chlorine-free halogenated alkanes include di-, tri-, and tetrafluoroethane.

When preparing a polyurethane polymer according to this invention, the polyisocyanate is used in an amount to provide for an isocyanate reaction index of advantageously from about 80 to about 120, preferably from about 90 to about 110, and more preferably from about 95 to about 105. By the term "isocyanate index" it is understood that at an index of 100, that one equivalent of isocyanate is present for each isocyanate reactive hydrogen atom present from the polyol, or other active hydrogen atom bearing substance able to react with the polyisocyanate.

Optionally but advantageously present when preparing the polyurethane polymer are additional additives including catalysts, surfactants, organic or inorganic fillers, pigments, fire retardants, antioxidants, and antistatic agents. The use of such additives is well known in the art and reference is made thereto for this purpose.

Suitable catalysts include the tertiary amine and organometallic compounds such as those described in U.S. Pat. No. 4,495,081. When using an amine catalyst advantageously it is present in an amount of from about 0.1 to about 3, preferably from about 0.1 to about 1.5 and more preferably from about 0.3 to about 1 weight percent by total weight of polyol and optional chain extending agent. When the catalyst is an organometallic catalyst, advantageously it is present in an amount of from about 0.001 to about 0.2, preferably from about 0.002 to about 0.1 and more preferably from about 0.01 to about 0.1 weight percent by total weight of polyol and optional chain extending agent. Particularly useful catalysts include triethylenediamine, bis(N, N-dimethylaminoethyl)ether and di(N,N--dimethylaminoethyl)amine, dialkyl tindicarboxylate substances including dimethyltin dilaurate, dibutyltin dilaurate, dioctyltin dilaurate, dibutyltin diacetate; and stannous octoate. Combinations of amine and organometallic catalysts advantageously may be employed.

Suitable surfactants include the diverse silicone surfactants, preferably those which are block copolymers of a polysiloxane and a polyoxyalkylene. Exemplary of such surfactants are the products DC-193 and Q4-3667 available from Dow Corning and TEGOSTAB B4113 available from Goldschmidt. When present, the amount of surfactants advantageously employed is from about 0.1 to about 2, and preferably from about 0.2 to about 1.3 percent by total weight of the polyol and optional chain extending agent. Other suitable surfactants also include non-silicone containing surfactants, such as poly(alkyleneoxides).

Suitable pigments and fillers include for example calcium carbonate, graphite, carbon black, titanium dioxide, iron oxide, alumina trihydrate, wollastonite, prepared glass fibers dropped or continuous, polyesters and other polymeric fibers. Exemplary of other organic fillers include cellulose, wood fiber and polyurethane regrind.

As mentioned, the carbamate adducts of this invention can impart an enhanced abrasion resistance to polyurethane polymers, however if further enhancement of abrasion resistance is required additives such as liquid polybutadiene in the procedure as disclosed in U.S. Pat. No. 5,510,054, incorporated herein by reference, can be employed.

Suitable methods of intimately mixing the urethane-modified polyisocyanate with the polyol include molding techniques such as described in, for example, "Polyurethanes Handbook" by Günter Oertel Hanser Publishes Munich ISBN 0-02-948920-2 (1985). Other suitable methods for preparing microcellular and elastomeric polyurethane polymers are described, for example, in U.S. Pat. Nos. 4,297,444; 4,218,543; 4,444,910; 4,530,941 and 4,269,945.

The polyurethane elastomer disclosed herein is preferably a microcellular polyurethane elastomer. Such an elastomer is typically prepared by intimately mixing the reaction components at room temperature or a slightly elevated temperature for a short period and then pouring the resulting mixture into an open mold, or injecting the resulting mixture into a closed mold, which in either case is heated. Upon completion of the reaction, the mixture takes the shape of the mold to produce a polyurethane elastomer of a predefined structure, which can then be sufficiently cured and removed from the mold with a minimum risk of incurring deformation greater than that permitted for its intended end application. Suitable conditions for promoting the curing of the elastomer include a mold temperature of typically from about 20° C. to about 150° C., preferably from about 35° C. to about 75° C., and more preferably from about 45° C. to about 55° C. Such temperatures generally permit the sufficiently cured elastomer to be removed from the mold typically in less than about 10 minutes and more typically in less than 5 minutes after intimately mixing the reactants. Optimum cure conditions will depend on the particular components including catalysts and quantities used in preparing the elastomer and also the size and shape of the article manufactured.

The polyurethane elastomer disclosed herein is useful in the preparation of articles such as, for example, carpet, rollers, door seals, coatings, tires, wiper blades, steering wheels, gaskets, belts, panels and shoe soles.

The following examples are provided to illustrate the invention but are not intended to limit the scope thereof. All parts and percentages are given by weight unless otherwise indicated. Material used in the examples are identified as follows:

Polyol 1: A 1600 equivalent weight glycerine-initiated poly(oxypropylene-oxyethylene)triol having a PO:EO ratio by weight of 87:13.

Polyol 2: A 1000 equivalent weight poly(oxypropylene-oxyethylene)diol having a PO:EO ratio by weight of 90:10.

Polyol 3: A 1830 equivalent weight glycerine-initiated poly(oxypropylene-oxyethylene)triol having a PO:EO ratio by weight of 80:20 and further containing 20 weight percent of a grafted styrene/acrylonitrile polymer.

Polyisocyanate 1: a urethane-modified polyisocyanate having an isocyanate content of 29 weight percent and being obtained by reaction of tripropylene glycol with a mixture of methylene diphenylisocyanate and polymethylene polyphenyl polyisocyanate.

Catalyst 1: N,N,N',N'-tetramethyl-n-hexyldiamine.

Catalyst 2: diethanolamine.

Catalyst 3: Dibutyltin dilaurate.

Example 1

Alkanolamine/carbon dioxide adducts are prepared according to the following procedure using a standard glass-lined reactor equipped with a mechanical stirrer and a heat exchanger jacket.

Adduct 1: A mixture comprising 500 parts by weight of ethylene glycol and 500 parts by weight of 2-(2-aminoethoxy)ethanol is prepared. To this mixture at ambient temperature and pressure is added incrementally 105 parts by weight of gaseous carbon dioxide. The rate of addition of the carbon dioxide is limited to avoid temperature in excess of 50° C. being generated.

Adduct 2: A mixture comprising 500 parts by weight of ethylene glycol and 500 parts by weight of 2-(2-(2-aminoethoxy)ethoxy)ethanol is prepared. To this mixture at ambient temperature and pressure is added incrementally 74 parts by weight of gaseous carbon dioxide. The rate of addition of the carbon dioxide is limited to avoid temperature in excess of 50° C. being generated.

Adduct 3 (Comparative, alkanolamine without an ether linkage): A mixture comprising 500 parts by weight of ethylene glycol and 500 parts by weight of 2-aminoethanol is prepared. To this mixture at ambient temperature and pressure is added incrementally 181 parts by weight of gaseous carbon dioxide. The rate of addition of the carbon dioxide is limited to avoid temperature in excess of 50° C. being generated.

Example 2

This example demonstrates the use of carbamate adducts of this invention in the preparation of a integral-skinned polyurethane steering wheel. The molded polyurethane is prepared according to the following formulation as given in Table 1 and by mixing the reactants with a high pressure dispenser equipped with a Cannon A40, 14mm, FPL mixing head. The reacting component temperature is about 25° C., and the mold temperature about 45° C. The quantity of reactants dispensed is sufficient to provide for a molded product having an overall density as indicated in Table 1. The polyurethane product is removed from the mold after 3 minutes and the abrasion resistance observed 72 hours later. The abrasion resistance performance as reported in Table 1 is observed according to the following procedure:

i) the steering wheel is blocked in a horizontal position;

ii) one edge of a cotton strip (width 35 mm, mass 250±15 g/m$^2$, yarn warp 25–26, yarn for filing 21–22) is attached to a moving device which transmits a horizontal movement of about 13 Hz/min with a displacement of about 70 mm, the other edge is fixed to a mass of 1 kg;

iii) the cotton strip is positioned against the wheel such that its movement subjects the wheel to abrasion.

After 500 abrasive cycles the abraded area of the steering wheel is checked and compared with a non-abraded area of the same steering wheel.

TABLE 1

| Reactants (pbw) | Foam 1 | Foam 2 | Foam 3* |
|---|---|---|---|
| Polyol 1 | 40 | 40 | 40 |
| Polyol 2 | 27 | 27 | 27 |
| Polyol 3 | 18 | 18 | 18 |
| BAYFLEX N | 6 | 6 | 6 |
| Ethylene glycol | 4.5 | 4 | 4.6 |
| Adduct 1 | 3.0 | / | / |
| Adduct 2 | / | 4.2 | / |
| Adduct 3* | | | 2.7 |
| Water | 0.15 | 0.15 | 0.15 |
| Catalyst 1 | 0.39 | 0.39 | 0.39 |
| Catalyst 2 | 0.2 | 0.2 | 0.2 |
| Catalyst 3 | 0.01 | 0.01 | 0.01 |
| Polyisocyanate 1 | 110 | 110 | 110 |
| Index: | | | |
| Density kg/m$^3$ | 520 | 520 | 520 |
| Hardness, Shore A | 61 | 62 | 61 |
| Abrasion Resistance: | | | |
| 500 cycles | none | none | some |
| 1000 cycles | none | none | much |
| 1500 cycles | none | none | n.o. |
| 2000 cycles | none | some | n.o. |
| 2500 cycles | some | much | n.o. |

*Not an example of this invention.
n.o. Not observed

The results reported in Table 1 show that polyurethane foam prepared in the presence of carbamate adducts as described for this invention exhibit improved abrasion resistance compared to polyurethane products prepared in the presence of a carbamate adduct characterized by absence of an ether linkage.

What is claimed is:

1. A polyurethane foam obtained by reacting an organic polyisocyanate with a polyether or polyester polyol in the presence of a blowing agent which comprises a carbamate adduct obtained by contacting carbon dioxide with an alkanolamine wherein the alkanolamine is a substance containing one or two ether moieties per molecule.

2. A polyurethane foam obtained by reacting an organic polyisocyanate with a polyether or polyester polyol in the presence of a blowing agent that comprises a carbamate composition which comprises a liquid composition which, based on their combined total weight, comprises (a) from about 5 to about 95 weight percent of a carbamate adduct, and (b) from about 95 to about 5 weight percent of a non aqueous medium, characterized in that the carbamate adduct is obtained by contacting carbon dioxide with an alkanolamine being a substance containing one or two ether moieties per molecule.

3. An integral-skinned polyurethane foam obtained by reacting a reaction mixture in a closed mold wherein said reaction mixture contains:

(a) an organic polyisocyanate having an isocyanate content of from about 15 to about 31 weight percent;

(b) a polyether or polyester polyol having an average of from about 2 to about 4 hydroxyl groups per molecule and an average molecular weight of from about 1000 to about 10000;

(c) a chain extending agent; and (d) a blowing agent which comprises a carbamate composition obtained by contacting carbon dioxide with an alkanolamine wherein the alkanolamine is a substance containing one or two ether moieties per molecule.

4. An integral-skinned polyurethane foam according to claim 3 wherein the carbamate composition comprises a liquid composition which, based on their combined total weight, comprises (a) from about 5 to about 95 weight percent of a carbamate adduct, and (b) from about 95 to about 5 weight percent of a non aqueous medium, characterized in that the carbamate adduct is obtained by contacting carbon dioxide with an alkanolamine being a substance containing one or two ether moieties per molecule.

5. The integral-skinned polyurethane foam of claim 4 wherein the blowing agent is free of any chlorofluorocarbon substance.

6. The polyurethane foam of claim 1 wherein the alkanolamine is a primary amine.

7. The polyurethane foam of claim 6 wherein the alkanolamine is 2-(2-aminoethoxy)ethanol or 2-(2-(2-aminoethoxy)ethoxy)ethanol.

8. The polyurethane foam of claim 1 wherein the carbamate is present during the preparation of the foam in an amount of from about 0.1 to about 10 parts per 100 parts of polyol.

9. The polyurethane foam of claim 2 which comprises the carbamate adduct in an amount of from about 25 to about 85 weight percent, and the polar medium in an amount of from about 75 to about 15 weight percent.

10. The polyurethane foam of claim 3 wherein the alkanolamine corresponds to one of the following formulas:

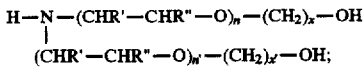

or

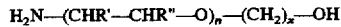

where independently R' is hydrogen, methyl or ethyl; R" is hydrogen, methyl or ethyl; the integer n is 1 or 2 or n' is 0, 1 or 2 with the proviso that the sum of n and n' is less than 3; and the integer x or x' is a whole number of from 1 to 4.

11. The polyurethane foam of claim 2 wherein the alkanolamine is 2-(2-aminoethoxy)ethanol or 2-(2-(2-aminoethoxy)ethoxy)ethanol.

12. The polyurethane foam of claim 2 wherein the medium is a protic substance being a liquid diol or triol.

13. The polyurethane foam of claim 2 wherein the carbamate composition is present in the foam reaction in an amount of from about 0.1 to about 10 parts per 100 parts by weight of polyol.

* * * * *